United States Patent
Suzuki et al.

(10) Patent No.: US 12,209,629 B2
(45) Date of Patent: Jan. 28, 2025

(54) FRICTION MATERIAL AND FRICTION MATERIAL COMPOSITION

(71) Applicant: ADVICS CO., LTD., Kariya (JP)

(72) Inventors: Shusuke Suzuki, Kariya (JP); Naoki Odani, Kariya (JP); Masaaki Kobayashi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 515 days.

(21) Appl. No.: 17/637,367

(22) PCT Filed: Aug. 19, 2020

(86) PCT No.: PCT/JP2020/031282
§ 371 (c)(1),
(2) Date: Feb. 22, 2022

(87) PCT Pub. No.: WO2021/039534
PCT Pub. Date: Mar. 4, 2021

(65) Prior Publication Data
US 2022/0316543 A1 Oct. 6, 2022

(30) Foreign Application Priority Data
Aug. 23, 2019 (JP) .................. 2019-153004

(51) Int. Cl.
*F16D 69/02* (2006.01)
*C04B 111/00* (2006.01)
*C08K 3/16* (2006.01)
*C08K 3/22* (2006.01)

(52) U.S. Cl.
CPC .............. *F16D 69/026* (2013.01); *C08K 3/16* (2013.01); *C04B 2111/00362* (2013.01); *C04B 2235/3222* (2013.01); *C08K 2003/2265* (2013.01); *F16D 2200/006* (2013.01); *F16D 2200/0065* (2013.01)

(58) Field of Classification Search
CPC ..... F16D 69/02–028; F16D 2200/0039; F16D 2200/0043; F16D 2200/006; F16D 2200/0065; C04B 2111/00362; C04B 2235/3222; C04B 2235/3234; C08K 2003/2237; C08K 2003/2265–2275; C08K 3/16
See application file for complete search history.

(56) References Cited

FOREIGN PATENT DOCUMENTS

| CN | 105650167 A | 6/2016 |
|----|-------------|--------|
| CN | 105650168 A | 6/2016 |
| CN | 105715716 A | 6/2016 |
| JP | 2018172496 A | 11/2018 |

OTHER PUBLICATIONS

International Search Report (PCT/ISA/210) with translation and Written Opinion (PCT/ISA/237) mailed on Nov. 2, 2020, by the Japan Patent Office as the International Searching Authority for International Application No. PCT/JP2020/031282.

*Primary Examiner* — Kregg T Brooks
(74) *Attorney, Agent, or Firm* — BUCHANAN INGERSOLL & ROONEY PC

(57) ABSTRACT

A friction member according to an embodiment is a friction material having a copper content of less than 5 wt %, the friction material including a titanic acid salt having a content of 1 wt % or more and 8 wt % or less, a cryolite powder having a content of 0.5 wt % or more and 5 wt % or less, and an iron oxide powder having a median diameter of 15 to 30 μm (D50) and a content of 1 wt % or more and 10 wt % or less.

9 Claims, 2 Drawing Sheets

FIG. 1

| COMPOSITION (wt%) | EXAMPLES | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| FIBER BASE MATERIAL | 12 | 12 | 12 | 12 | 12 | 12 | 12 | 12 | 12 | 12 | 12 | 12 | 12 | 12 | 12 | 12 | 12 | 12 | 12 | 12 |
| ORGANIC FILLER | 8 | 8 | 8 | 8 | 8 | 8 | 8 | 8 | 8 | 8 | 8 | 8 | 8 | 8 | 8 | 8 | 8 | 8 | 8 | 8 |
| ABRASIVE | 2 | 2 | 2 | 2 | 2 | 2 | 2 | 2 | 2 | 2 | 2 | 2 | 2 | 2 | 2 | 2 | 2 | 2 | 2 | 2 |
| IRON OXIDE POWDER (SIZE) 15 | | 1 | 1 | 1 | 1 | 1 | 1 | 2 | 2 | | 5 | 10 | 1 | 10 | 1 | 10 | 1 | 10 | 10 | |
| IRON OXIDE POWDER (SIZE) 30 | 1 | | | | | | | | | 2 | | | | | | | | | | 10 |
| IRON OXIDE POWDER (SIZE) 50 | | | | | | | | | | | | | | | | | | | | |
| TITANIC ACID SALT (LAYERED CRYSTAL) | 1 | 1 | 1 | 3 | 3 | 3 | 6 | 6 | 6 | 6 | 6 | 6 | 8 | | 8 | 8 | 8 | 8 | 8 | 8 |
| LUBRICANT | 7 | 7 | 7 | 7 | 7 | 7 | 7 | 7 | 7 | 7 | 7 | 7 | 7 | 7 | 7 | 7 | 7 | 7 | 7 | 7 |
| COPPER FIBER | | | | | | | | | 4 | 4 | 4 | 4 | 4 | 4 | | | | | | |
| INORGANIC FILLER CRYOLITE POWDER | 2 | 2 | 0.5 | 2 | 2 | 2 | 2 | 2 | 2 | 2 | 2 | 2 | 2 | 2 | 2 | 2 | 2 | 0.5 | 5 | 5 |
| ADJUSTMENT MATERIAL *1 | 9 | 9 | 9 | 9 | 9 | 9 | 9 | 9 | 9 | 9 | 9 | 9 | 9 | 9 | 9 | 9 | 9 | 9 | 9 | 9 |
| OTHER *2 | 49 | 49 | 50.5 | 47 | 44 | 47 | 44 | 43 | 39 | 39 | 36 | 31 | 38 | 29 | 42 | 33 | 43.5 | 34.5 | 30 | 30 |
| RESIN | 9 | 9 | 9 | 9 | 9 | 9 | 9 | 9 | 9 | 9 | 9 | 9 | 9 | 9 | 9 | 9 | 9 | 9 | 9 | 9 |
| TOTAL | 100 | 100 | 100 | 100 | 100 | 100 | 100 | 100 | 100 | 100 | 100 | 100 | 100 | 100 | 100 | 100 | 100 | 100 | 100 | 100 |
| EFFICACY — VIBRATION 10 μm > ○ | ○ | ○ | ○ | ○ | ○ | ○ | ○ | ○ | ○ | ○ | ○ | ○ | ○ | ○ | ○ | ○ | ○ | ○ | ○ | ○ |
| NOISE 70 db > NO CONTINUITY | ○ | ○ | ○ | ○ | ○ | ○ | ○ | ○ | ○ | ○ | ○ | ○ | ○ | ○ | ○ | ○ | ○ | ○ | ○ | ○ |
| JASO-2E 0.3 ≤ | 0.36 | 0.37 | 0.37 | 0.39 | 0.39 | 0.37 | 0.38 | 0.39 | 0.41 | 0.40 | 0.40 | 0.45 | 0.40 | 0.45 | 0.41 | 0.44 | 0.40 | 0.44 | 0.44 | 0.45 |
| FIRST FADE 0.2 ≤ | 0.2 | 0.21 | 0.21 | 0.23 | 0.24 | 0.21 | 0.21 | 0.20 | 0.22 | 0.23 | 0.23 | 0.25 | 0.25 | 0.25 | 0.25 | 0.25 | 0.25 | 0.23 | 0.23 | 0.23 |
| ○ WHEN BOTH THE ABOVE VALUES ARE SATISFIED | ○ | ○ | ○ | ○ | ○ | ○ | ○ | ○ | ○ | ○ | ○ | ○ | ○ | ○ | ○ | ○ | ○ | ○ | ○ | ○ |
| WEAR RATE AT 200°C ○ < 4 (mm³/Nm×10⁻³) | ○ | ○ | ○ | ○ | ○ | ○ | ○ | ○ | ○ | ○ | ○ | ○ | ○ | ○ | ○ | ○ | ○ | ○ | ○ | ○ |
| WEAR RATE AT 300°C ○ < 6 (mm³/Nm×10⁻³) | ○ | ○ | ○ | ○ | ○ | ○ | ○ | ○ | ○ | ○ | ○ | ○ | ○ | ○ | ○ | ○ | ○ | ○ | ○ | ○ |
| WEAR RATE AT 400°C ○ < 10 (mm³/Nm×10⁻³) | ○ | ○ | ○ | ○ | ○ | ○ | ○ | ○ | ○ | ○ | ○ | ○ | ○ | ○ | ○ | ○ | ○ | ○ | ○ | ○ |
| MAXIMUM FRICTION COEFFICIENT AFTER BEING LEFT AT LOW TEMPERATURE (○ < 0.60) | ○ | ○ | ○ | ○ | ○ | ○ | ○ | ○ | ○ | ○ | ○ | ○ | ○ | ○ | ○ | ○ | ○ | ○ | ○ | ○ |

*1 SULFIDE (ANTIMONY SULFIDE, TIN SULFIDE, ETC.), OXIDE, MICA, ETC. *2 BARIUM SULFATE, CALCIUM HYDROXIDE, CALCIUM SILICATE, CALCIUM CARBONATE, ETC.

FIG. 2

| COMPOSITION (wt%) | COMPARATIVE EXAMPLES |||||||||||||||||||||||||
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| FIBER BASE MATERIAL | 12 | 12 | 12 | 12 | 12 | 12 | 12 | 12 | 12 | 12 | 12 | 12 | 12 | 12 | 12 | 12 | 12 | 12 | 12 | 12 | 12 | 12 | 12 | 12 | 12 |
| ORGANIC FILLER | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 |
| ABRASIVE | 20 | 20 | 20 | 20 | 20 | 20 | 20 | 20 | 30 | 20 | 10 | 10 | 10 | 30 | 2 | 2 | 2 | 2 | 2 | 2 | 2 | 2 | 2 | 2 | 2 |
| IRON OXIDE POWDER (SIZE) 10 | 1 | 10 | 1 | 10 | | | 2 | 5 | 10 | 10 | | | 1 | 10 | | | 2 | 2 | | | | | | | |
| IRON OXIDE POWDER (SIZE) 15 | | | | | 2 | 5 | 2 | 5 | 10 | | | | | | 2 | 2 | 2 | | 2 | | | 2 | 2 | | |
| IRON OXIDE POWDER (SIZE) 30 | | | | | | | | | | | | | | | | | | 2 | | 10 | 10 | | | 10 | 10 |
| TITANIC ACID SALT (LAYERED CRYSTAL) | 6 | 8 | 8 | 6 | 6 | 6 | 6 | 6 | 9 | 9 | 9 | 9 | 0 | 0 | 0 | 6 | 6 | 9 | 6 | 6 | 9 | 9 | 9 | 9 | 9 |
| LUBRICANT | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| COPPER FIBER | 4 | 4 | 4 | 4 | | | | 4 | 4 | | 4 | | | | | | 4 | | | | | | 4 | | |
| INORGANIC FILLER CRYOLITE POWDER | 5 | 5 | 4 | | | | | | | | | | 2 | 2 | 2 | | | 2 | 2 | 2 | 2 | 2 | 6 | 6 | 6 |
| ADJUSTMENT MATERIAL *1 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 |
| OTHER *2 | 19 | 10 | 24 | 15 | 27 | 24 | 23 | 20 | 2 | 16 | 32 | 36 | 42 | 13 | 49 | 45 | 41 | 40 | 43 | 35 | 32 | 36 | 32 | 28 | 24 |
| RESIN | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 |
| TOTAL | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| VIBRATION 10 μm > ○ | ○ | ○ | ○ | ○ | × | ○ | ○ | × | × | × | ○ | ○ | × | ○ | × | ○ | ○ | ○ | ○ | ○ | × | ○ | ○ | × | × |
| NOISE 70 dB > NO CONTINUITY | × | × | ○ | × | × | × | ○ | × | × | ○ | ○ | ○ | ○ | × | × | ○ | ○ | ○ | × | ○ | × | × | × | × | × |
| EFFICACY JASO-2E 0.3 ≦ | 0.33 | 0.35 | 0.33 | 0.35 | 0.41 | 0.42 | 0.41 | 0.42 | 0.45 | 0.45 | 0.37 | 0.36 | 0.36 | 0.45 | 0.45 | 0.45 | 0.45 | 0.45 | 0.45 | 0.45 | 0.45 | 0.40 | 0.41 | 0.41 | 0.45 |
| FIRST FADE 0.25 | 0.18 | 0.20 | 0.15 | 0.18 | 0.15 | 0.21 | 0.16 | 0.15 | 0.21 | 0.21 | 0.14 | 0.13 | 0.12 | 0.13 | 0.14 | 0.24 | 0.24 | 0.24 | 0.24 | 0.24 | 0.24 | 0.20 | 0.20 | 0.20 | 0.20 |
| ○ WHEN BOTH THE ABOVE VALUES ARE SATISFIED | × | ○ | × | × | × | ○ | × | × | ○ | ○ | × | × | × | × | × | ○ | ○ | ○ | ○ | ○ | ○ | ○ | ○ | ○ | ○ |
| WEAR RATE AT 200°C ○ < 4 (mm³/N·m×10⁻⁵) | ○ | ○ | ○ | ○ | ○ | ○ | × | × | ○ | ○ | ○ | ○ | × | × | × | × | × | ○ | ○ | ○ | × | ○ | ○ | ○ | × |
| WEAR RATE AT 300°C ○ < 6 (mm³/N·m×10⁻⁵) | ○ | ○ | × | ○ | × | × | × | ○ | ○ | × | ○ | ○ | × | × | × | × | ○ | ○ | ○ | ○ | ○ | ○ | ○ | ○ | ○ |
| WEAR RATE AT 400°C ○ < 10 (mm³/N·m×10⁻⁵) | ○ | ○ | × | ○ | × | ○ | ○ | ○ | ○ | × | ○ | × | × | × | × | × | × | ○ | ○ | ○ | ○ | ○ | ○ | ○ | ○ |
| MAXIMUM FRICTION COEFFICIENT AFTER BEING LEFT AT LOW TEMPERATURE (○ < 0.60) | × | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |

*1 SULFIDE (ANTIMONY SULFIDE, TIN SULFIDE, ETC.), OXIDE, MICA, ETC.  *2 BARIUM SULFATE, CALCIUM HYDROXIDE, CALCIUM SILICATE, CALCIUM CARBONATE, ETC.

FRICTION MATERIAL AND FRICTION MATERIAL COMPOSITION

TECHNICAL FIELD

The disclosure here relates to a friction material and a friction material composition.

BACKGROUND ART

In recent years, from the viewpoint of river pollution, marine pollution, an adverse effect on the human body, and the like, the demand for environmental compatibility for the materials included in brake pads is also becoming strict.

For this reason, it is desired to develop a brake pad (friction material) that does not contain a metal material having a high environmental load such as copper (content is reduced).

CITATIONS LIST

Patent Literature

Patent Literature 1: JP 2018-172496 A

SUMMARY

Technical Problems

Therefore, for example, in the technique described in Patent Literature 1, a friction material composition containing 1 to 8 mass % of a carbonaceous lubricant containing scaly graphite as a lubricant, 10 to 30 mass % of at least one of zirconium silicate, zirconium oxide, and magnesium oxide as an abrasive, and 15 to 28 mass % of a titanic acid salt as an inorganic filler has been proposed for the purpose of forming an appropriate amount of a transfer film in both light load braking and high load braking.

However, according to the above composition, there has been a possibility that the effect of braking is reduced, wear of a rotor and judder (brake vibration) deteriorate due to an increase in attacking property on a rotor caused by a large amount of hard raw material, or a friction coefficient becomes unstable, and unpleasant noise occurs.

Therefore, disclosed here are a friction material and a friction material composition which are capable of obtaining a stable effect even in braking at a high temperature or a high load and braking after thermal history in a friction material not containing (or having a reduced content of) a metal material having a high environmental load such as copper or antimony, and have excellent wear resistance.

Solutions to Problems

In order to solve the above problems, a friction material according to an embodiment is a friction material having a copper content of less than 5 wt %, the friction material including a titanic acid salt having a content of 1 wt % or more and 8 wt % or less, a cryolite powder having a content of 0.5 wt % or more and 5 wt % or less, and an iron oxide powder having a median diameter of 15 to 30 μm (D50) and a content of 1 wt % or more and 10 wt % or less.

According to the above configuration, a stable effect can be obtained even in braking at a high temperature or a high load or braking after thermal history, and a friction material having excellent wear resistance can be obtained.

Furthermore, a composition for a friction material having a copper content of less than 5 wt % includes a fiber base material, an organic filler, an abrasive, a titanic acid salt having a content of 1 wt % or more and 8 wt % or less, an iron oxide powder having a median diameter of 15 to 30 μm (D50) and a content of 1 wt % or more and 10 wt % or less, a lubricant, and an inorganic filler containing a cryolite powder having a content of 0.5 wt % or more and 5 wt % or less.

According to the above configuration, it is possible to obtain a composition for a friction material capable of obtaining a stable effect even in braking at a high temperature or a high load or braking after thermal history, and having excellent wear resistance.

BRIEF DESCRIPTION OF DRAWINGS

FIG. 1 is an explanatory diagram of a performance evaluation result of examples.

FIG. 2 is an explanatory diagram of a performance evaluation result of comparative examples.

DESCRIPTION OF EMBODIMENTS

Exemplary embodiments of the present disclosure will now be described in detail with reference to the drawings.

The configurations of the embodiments described below, and the functions and results (effects) provided by the configurations are examples. The present disclosure can also be realized by configurations other than those disclosed in the following embodiments. In addition, according to the present disclosure, it is possible to obtain at least one of various effects (including derivative effects) obtained by the configurations.

First, an embodiment will be described.

A friction material of an embodiment is a friction material having a copper content of less than 5 wt % ("wt %" means "weight %"), the friction material including a titanic acid salt having a content of 1 wt % or more and 8 wt % or less, a cryolite powder having a content of 0.5 wt % or more and 5 wt % or less, and an iron oxide powder having a median diameter of 15 to 30 μm (D50) and a content of 1 wt % or more and 10 wt % or less.

The reason for the above configuration is that a transfer film (film: transfer layer) is formed on a disk rotor by combining the titanic acid salt and cryolite (powder), and the formed transfer film does not become too thick.

On the other hand, when the contents of the titanic acid salt and the cryolite powder deviate from the above range, the stability of the effect of a brake is deteriorated due to insufficient formation or an excessive thickness of the transfer film, the wear resistance of a brake pad is deteriorated, and adverse effects such as shortening of the life and generation of noise occur. Note that, as the titanic acid salt to be used, a general titanic acid salt other than a fibrous titanic acid salt and a whisker titanic acid salt can be used from the viewpoint of environmental load, but it is preferable to use a layered crystal titanic acid salt from the viewpoint of a friction coefficient and formation of a transfer film.

Further, specifically, magnetite and hematite are preferable as the iron oxide powder. The particle diameter is preferably 15 to 30 μm as a median diameter (D50). This is because when the median diameter (D50) is less than 15 μm, an increase in the friction coefficient after being left at a low temperature cannot be suppressed. In addition, when the median diameter (D50) is more than 30 μm, the attacking property on the disk rotor increases, and the wear of the disk rotor increases due to braking from the normal time at a high load or at a high temperature, so that judder (brake vibration) due to DTV growth occurs. Therefore, this is to avoid these.

As a result, a stable effect is obtained even in braking at a high temperature or a high load or braking after thermal history, and excellent wear resistance is obtained.

By the way, the role of copper is mainly to form a stable transfer film at a high temperature or a high load to exhibit a stable effect of braking and wear resistance of a brake pad, and further to stabilize the effect of braking due to a small increase in friction coefficient by the formed transfer film even at a low temperature.

However, the use of copper is not preferable from the viewpoint of environmental load.

Therefore, in the present embodiment, the role of copper is substituted by including a titanic acid salt having a content of 1 wt % or more and 8 t % or less, a cryolite powder having a content of 0.5 wt % or more and 5 wt % or less, and an iron oxide powder having a median diameter of 15 to 30 μm (D50) and a content of 1 wt % or more and 10 wt % or less, so that the environmental load is low, and performance equivalent to that in a case of containing a large amount of copper can be maintained.

Next, a more specific method for manufacturing a brake pad including a friction material (lining) will be described.

First, predetermined raw materials are mixed to obtain mixed powder (friction material composition).

Here, the predetermined raw material is a fiber base material, an organic filler, an abrasive, an inorganic filler, a lubricant, a copper fiber, a resin, or the like.

In this case, examples of the fiber base material include aramid fibers, inorganic fibers, and metal fibers.

Examples of the organic filler include cashew dust and rubber powder.

As the abrasive, for example, a substance having a Mohs hardness of 6.5 or more can be used, and examples thereof include silica such as silicon dioxide, zirconium silicate, zirconium oxide, alumina oxide, chromium oxide, ceramic powder, and the like, and iron oxide and magnesium oxide can also be contained.

Examples of the lubricant include graphite and mica.

Examples of the inorganic filler include barium sulfate, calcium hydroxide, calcium silicate, and calcium carbonate in addition to iron oxide (iron oxide powder), titanic acid salt, cryolite (powder), and adjustment material (sulfide, oxide, mica, and the like).

Furthermore, talc, kaolin, vermiculite, and the like may be contained.

In this case, mica has cleavability and also functions as a lubricant.

Calcium hydroxide (slaked lime) also functions as a pH adjusting material.

It is to be noted that a single metal or alloy metal powder, fiber, or the like may be contained as necessary.

First, predetermined raw materials are sufficiently mixed, and then premolding is performed by a premolding step. In this preliminary molding, molding is performed to such an extent that a mixture of friction materials can be placed on a predetermined back plate.

Subsequently, preformed lining is set in a mold for pressurization and heating of a thermoforming device in a state of being arranged at a predetermined position of the back plate, and thermoforming is performed in a first temperature zone (For example, lower than 200° C.)

This thermoforming is performed in order to sufficiently dissolve a certain bonding material (binder) added as a raw material, then cure the bonding material, and maintain the shape of the lining (or brake pad) in a heat treatment performed in a subsequent stage. A predetermined raw material is introduced into a predetermined mold in a state where a back plate is disposed in the predetermined mold, and pressurization (molding pressure=10 to 25 MPa) and heating are performed.

In this state, the brake pad provided with the back plate and the lining is subjected to heat treatment for curing the lining by heating for a predetermined time (for example, 1 hour to 2 hours) in a second temperature zone (for example, 200 to 240° C.) higher than the first temperature zone in a pressurized state for suppressing deformation.

Subsequently, the brake pad after the heat treatment is subjected to predetermined finish processing to form a product.

According to the present embodiment, a lining (friction material) can be obtained, which is a friction material having a copper content of less than 5 wt %, including a titanic acid salt having a content of 1 wt % or more and 8 wt % or less, a cryolite powder having a content of 0.5 wt % or more and 5 wt % or less, and an iron oxide powder having a median diameter of 15 to 30 μm (D50) and a content of 1 wt % or more and 10 wt % or less.

According to the friction material of the present embodiment, noise generation can be effectively suppressed while securing stable effect and excellent wear resistance even in braking at a high temperature or a high load and braking after thermal history.

In particular, in the friction material in which the cryolite powder having a content of 0.5 wt % or more and 3 wt % or less is blended, the thickness of the transfer-film can be optimized, and the generation of noise can be further suppressed while the stability of the effect of braking and the pad life (abrasion resistance) are further improved.

In addition, in the friction material blended with the iron oxide powder having a median diameter of 15 to 30 μm (D50) with the content of 1 wt % or more and 7 wt % or less, it is possible to further suppress the rotor wear in the braking from the normal time at a high temperature or at a high load, to suppress a rotor wall thickness difference (DTV), and to suppress a brake vibration.

EXAMPLES

Next, examples will be described in detail.

[1] Examples

FIG. 1 is an explanatory diagram of performance evaluation according to examples.

In the following description, main examples will be mainly described in detail.

[1.1] Example 1

First, a compounding composition of a first example (referred to as Example 1 in FIG. 1; the same applies hereinafter) will be described.

The compounding composition of the examples roughly include fiber base materials, organic fillers, abrasives, inorganic fillers, lubricants, copper fibers, and resins.

Hereinafter, the compounding composition of Example 1 will be described in detail.

In Example 1, 12 wt % of a fiber base material is blended. Noted that copper fibers are not blended as a fiber base material.

In Example 1, 8 wt % of an organic filler is blended.

In Example 1, 2 wt % of an abrasive is blended.

In Example 1, 1 wt % of an iron oxide powder having a median diameter (D50) of 30 μm is blended as an inorganic filler.

In Example 1, 1 wt % of a layered crystal titanic acid salt is blended as an inorganic filler.

In Example 1, 7 wt % of a lubricant is blended.

In Example 1, no copper fiber is blended.

In Example 1, 2 wt % of a cryolite powder as an inorganic filler is blended.

In Example 1, a total of 9 wt % of sulfide, oxide, mica, and the like as an adjusting material is blended.

In Example 1, as another raw material of the inorganic filler, barium sulfate, calcium hydroxide, calcium silicate, calcium carbonate, and the like are appropriately combined and blended at 48.5 wt %.

In Example 1, 9 wt % of a resin is added to the remainder for molding to make the total amount 100 wt %.

[1.2] Example 2

The compounding composition of Example 2 is different from the compounding composition of Example 1 in that 1 wt % of iron oxide powder having a median diameter (D50) of 15 μm is compounded with respect to the compounding of iron oxide powder as an inorganic filler.

Other compounding compositions are the same as those in Example 1.

[1.3] Example 3

The compounding composition of Example 3 is different from the compounding composition of Example 1 in that, regarding the compounding of an iron oxide powder as the inorganic filler, 1 wt % of an iron oxide powder having a median diameter (D50) of 15 μm is compounded, 0.5 wt % of a cryolite powder as the inorganic filler is compounded, and 50 wt % of other raw materials of the inorganic filler is compounded.

Other compounding compositions are the same as those in Example 1.

[1.4] Example 4

The compounding composition of Example 4 is different from the compounding composition of Example 1 in that, regarding the compounding of the iron oxide powder as the inorganic filler, 1 wt % of an iron oxide powder having a median diameter (D50) of 15 μm is blended, 3 wt % of a layered crystal titanic acid salt is blended as the inorganic filler, and 46.5 wt % of other raw materials of the inorganic filler is blended.

Other compounding compositions are the same as those in Example 1.

[1.5] Example 5

The compounding composition of Example 5 is different from the compounding composition of Example 1 in that 1 wt % of an iron oxide powder having a median diameter (D50) of 15 μm is compounded as the inorganic filler, 6 wt % of a layered crystal titanic acid salt is compounded as the inorganic filler, and 43.5 wt % of other raw materials of the inorganic filler is compounded.

Other compounding compositions are the same as those in Example 1.

[1.6] Example 6

The compounding composition of Example 6 is different from the compounding composition of Example 1 in that 3 wt % of a layered crystal titanic acid salt is blended as the inorganic filler, and 46.5 wt % of other raw materials of the inorganic filler is blended.

Other compounding compositions are the same as those in Example 1.

[1.7] Example 7

The compounding composition of Example 7 is different from the compounding composition of Example 1 in that 6 wt % of a layered crystal titanic acid salt is blended as the inorganic filler, and 43.5 wt % of other raw materials of the inorganic filler is blended.

Other compounding compositions are the same as those in Example 1.

[1.8] Example 8

The compounding composition of Example 8 is different from the compounding composition of Example 1 in that, regarding the compounding of the iron oxide powder as the inorganic filler, 2 wt % of an iron oxide powder having a median diameter (D50) of 15 μm is blended, 6 wt % of a layered crystal titanic acid salt is compounded as the inorganic filler, and 42.5 wt % of other raw materials of the inorganic filler is compounded.

Other compounding compositions are the same as those in Example 1.

[1.9] Example 9

The compounding composition of Example 9 is as illustrated in FIG. 1, and the detailed description thereof will be omitted.

[1.10] Example 10

The compounding composition of Example 10 is as illustrated in FIG. 1, and the detailed description thereof will be omitted.

[1.11] Example 11

The compounding composition of Example 11 is as illustrated in FIG. 1, and the detailed description thereof will be omitted.

[1.12] Example 12

The compounding composition of Example 12 is as illustrated in FIG. 1, and the detailed description thereof will be omitted.

[1.13] Example 13

The compounding composition of Example 13 is as illustrated in FIG. 1, and the detailed description thereof will be omitted.

[1.14] Example 14

The compounding composition of Example 14 is as illustrated in FIG. 1, and the detailed description thereof will be omitted.

[1.15] Example 15

The compounding composition of Example 15 is different from the compounding composition of Example 1 in that, regarding the compounding of the iron oxide powder as the inorganic filler, 1 wt % of an iron oxide powder having a median diameter (D50) of 15 μm is blended, 8 wt % of a layered crystal titanic acid salt is blended as the inorganic filler, and 29 wt % of other raw materials of the inorganic filler is blended.

Other compounding compositions are the same as those in Example 1.

[1.16] Example 16

The compounding composition of Example 16 is as illustrated in FIG. 1, and the detailed description thereof will be omitted.

[1.17] Example 17

The compounding composition of Example 17 is different from the compounding composition of Example 1 in that, regarding the compounding of the iron oxide powder as the inorganic filler, 1 wt % of an iron oxide powder having a median diameter (D50) of 15 μm is compounded, 8 wt % of a layered crystal titanic acid salt is compounded as the inorganic filler, 4 wt % of copper fiber is compounded, and 38 wt % of other raw materials of the inorganic filler is compounded.

Other compounding compositions are the same as those in Example 1.

[1.18] Example 18

The compounding composition of Example 18 is as illustrated in FIG. 1, and the detailed description thereof will be omitted.

[1.19] Example 19

The compounding composition of Example 19 is as illustrated in FIG. 1, and the detailed description thereof will be omitted.

[1.20] Example 20

The compounding composition of Example 20 is as illustrated in FIG. 1, and the detailed description thereof will be omitted.

[2] Comparative Examples

Next, comparative examples will be described.

FIG. 2 is an explanatory diagram of performance evaluation of comparative examples.

As with the compounding compositions of the examples, the compounding compositions of comparative examples roughly include fiber base materials, organic fillers, abrasives, inorganic fillers, lubricants, copper fibers, and resins.

As illustrated in FIG. 2, for example, the compounding compositions of Comparative Example 1 to Comparative Example 25 are made into comparative examples according to the present disclosure by varying the size and the compounding ratio of an iron oxide powder, the compounding ratio of titanic acid salt or cryolite powder, and the like. Therefore, a detailed description thereof will be omitted.

[3] Performance Evaluation

Next, performance evaluation results of the above examples and comparative examples will be described again with reference to FIGS. 1 and 2.

As the performance evaluation, vibration, noise, efficacy, a first fade, a wear rate (200° C., 300° C., 400° C.), and the maximum friction coefficient after being left at a low temperature were evaluated.

[3.1] Vibration

Regarding the vibration, it was evaluated whether or not the vibration was less than 10 μm (good).

[3.2] Noise

Regarding the noise, it was evaluated whether or not the noise was less than 70 db and was continuous (good).

[3.3] Efficacy

With respect to the efficacy, the standard of JASO-2E and the first fade were evaluated, and when both results were good, that was evaluated as good.
[3.3.1] JASO-2E
For the standard of JASO-2E, it was evaluated whether or not it exceeded 0.3 (good).
[3.3.2] First Fade
As for the first fade, the measurement was performed based on the JASO C406 standard, and it was evaluated whether or not it exceeded 0.2 (good).
[3.4] Wear Rate
As for the wear rate, the wear rate at 200° C., the wear rate at 300° C., and the wear rate at 400° C. were evaluated, respectively.
[3.4.1] Wear Rate at 200° C.
As for the wear rate at 200° C., the measurement was performed in accordance with the standard of JASO C427, and it was evaluated whether or not it was less than 4 (mm$^3$/Nm·10$^{-5}$) (good).
[3.4.2] Wear Rate at 300° C.
As for the wear rate at 300° C., the measurement was performed in accordance with the standard of JASO C427, and it was evaluated whether or not it was less than 6 (mm$^3$/Nm·10$^{-5}$) (good).
[3.4.3] Wear Rate at 400° C.
As for the wear rate at 400° C., the measurement was performed in accordance with the standard of JASO C427, and it was evaluated whether or not it was less than 10 (mm$^3$/Nm·10$^{-5}$) (good).

[3.5] Maximum Friction Coefficient after being Left at Low Temperature

It was evaluated whether or not the maximum coefficient of friction after being left at a low temperature was less than 0.60 (good).

Specifically, after 200 times of sliding, a process in which a vehicle was left standing in an environment of a temperature of 0° C. and a humidity of 40% RH for 2 hours, and braking at a vehicle speed of 10 km/h and brake fluid pressures of 0.5, 1.0, and 1.5 MPa was repeated twice at an interval of 120 seconds was defined as 1 cycle, and a total of 5 cycles were performed with 30 minutes left between the cycles. The maximum friction coefficient among a total of 30 times of braking was evaluated as the friction coefficient after being left at a low temperature.

[3.6] Evaluation Results

[3.6.1] Vibration

As illustrated in FIG. 1, good results satisfying less than 10 μm, which was practically sufficient, were obtained in all of Example 1 to Example 20.

Therefore, according to Example 1 to Example 20, it was found that the vibration was small and the generation of acoustic noise could be suppressed.

On the other hand, among Comparative Example 1 to Comparative Example 25, those satisfying less than 10 μm, which was practically sufficient, were Comparative Example 1 to Comparative Example 4, Comparative Example 7, Comparative Example 11, Comparative Example 12, Comparative Example 16 to Comparative Example 19, Comparative Example 22, and Comparative Example 23, and it was found that the other comparative examples had large vibration and poor practicability.

[3.6.2] Noise

As illustrated in FIG. 1, in any of Example 1 to Example 20, satisfactory results satisfying less than 70 db and the presence of continuity that were practically sufficient were obtained.

Therefore, according to Example 1 to Example 20, it was found that noise was small and was practically sufficient.

On the other hand, among Comparative Example 1 to Comparative Example 25, only Comparative Example 1, Comparative Example 2, Comparative Example 7, Comparative Example 10 to Comparative Example 12, Comparative Example 16, and Comparative Example 17 obtained good results satisfying less than 70 db and the presence of continuity, and the other comparative examples were found to be poor in practicality.

[3.6.3] Efficacy

As illustrated in FIG. 1, in any of Example 1 to Example 20, a result of more than 0.3 (good) was obtained for the standard of JASO-2E, and a result of more than 0.2 (good) was obtained for the first fade, so that the results were obtained that the reliability was sufficiently high and that it was practically sufficient.

On the other hand, in all of Comparative Example 1 to Comparative Example 25, the result of exceeding 0.3 (good) with respect to the standard of JASO-2E was obtained, but in Comparative Example 1, Comparative Example 3 to Comparative Example 5, Comparative Example 7, Comparative Example 8, and Comparative Example 11 to Comparative Example 15, the result was less than 0.2 in the measurement of the first fade, and it was found that the first fade was poor in practicality.

[3.6.4] Wear Rate

[3.6.4.1] Wear Rate at 200° C.

As illustrated in FIG. 1, in any of Example 1 to Example 20, a result of less than 4 (mm$^3$/Nm·10$^{-5}$) (good) was obtained, and a result that all examples were practically sufficient was obtained.

On the other hand, in Comparative Example 13, Comparative Example 14, Comparative Example 21, and Comparative Example 25, the wear rate was 4 (mm$^3$/Nm·10$^{-5}$) or more, and results indicating poor practicability were obtained.

[3.6.4.2] Wear Rate at 300° C.

As illustrated in FIG. 1, in any of Example 1 to Example 20, a result of less than 6 (mm$^3$/Nm·10$^{-5}$) (good) was obtained, and a result that all examples were practically sufficient was obtained.

On the other hand, in Comparative Example 13, Comparative Example 14, Comparative Example 16, and Comparative Example 25, the wear rate was 6 (mm$^3$/Nm·10$^{-5}$) or more, and results indicating poor practicability were obtained.

[3.6.4.3] Wear Rate at 400° C.

As illustrated in FIG. 1, in any of Example 1 to Example 20, a result of less than 10 (mm$^3$/Nm·10$^{-5}$) (good) was obtained, and a result that all examples were practically sufficient was obtained.

On the other hand, in Comparative Example 3, Comparative Example 5, Comparative Example 6, Comparative Example 10, and Comparative Example 12 to Comparative Example 17, the wear rate was 10 (mm$^3$/Nm·10$^{-5}$) or more, and the results that the stability and the wear resistance at the time of braking at a high temperature and a high load and braking after thermal history were low and the reliability was poor were obtained.

[3.6.5] Maximum Friction Coefficient after being Left at Low Temperature

As illustrated in FIG. 1, in any of Example 1 to Example 20, a result of less than 0.60 (good) was obtained, and in all examples, it was possible to suppress an increase in friction coefficient after being left at a low temperature, and furthermore, it was possible to suppress the generation of acoustic noise after being left at a low temperature, and a result was obtained that it was practically sufficient.

On the other hand, in Comparative Example 1 to Comparative Example 4, Comparative Example 10 to Comparative Example 12, Comparative Example 16, and Comparative Example 18 to Comparative Example 24, the friction coefficient was 0.60 or more, and it was found that acoustic noise might occur due to an increase in friction coefficient after being left at a low temperature.

[3.6.6] Comprehensive Evaluation

Based on the above description, it was found that according to Example 1 to Example 20, each of which was a friction material having a copper content of less than 5 wt %, and including a titanic acid salt having a content of 1 wt % or more and 8 wt % or less, a cryolite powder having a content of 0.5 wt % or more and 5 wt % or less, and an iron oxide powder having a median diameter of 15 to 30 μm (D50) and a content of 1 wt % or more and 10 wt % or less, it was possible to obtain a stable effect even in braking at a high temperature or under a high load and braking after thermal history, and the friction material had excellent wear resistance.

In particular, although not illustrated as a numerical value in FIG. 1, it was found that in a friction material in which the cryolite powder having a content of 0.5 wt % or more and 3 wt % or less was blended, the thickness of the transfer-film could be optimized, and the generation of noise could be further suppressed while the stability of the effect of braking and the pad life (wear resistance) were further improved.

Furthermore, it was found that in a friction material blended with the iron oxide powder having the median diameter of 15 to 30 μm (D50) with a content of 1 wt % or more and 7 wt % or less, it was possible to further suppress the rotor wear, suppress the occurrence of a rotor wall thickness difference (DTV), and suppress the brake vibration in the braking from the normal time at a high temperature or at a high load.

In addition, in the friction material in which a copper content is less than 0.5 wt %, an environmental load can be further reduced.

[4] MODIFIED EXAMPLE OF EMBODIMENT

In the above description, the application of the brake pad is not limited, but in addition to a floating type as a disc brake, a so-called opposed type (opposed piston type) in which pistons as pressing members are disposed to face each other and the pistons disposed to face each other press a pair of brake pad assemblies against a disc rotor (friction material) can be similarly applied.

Furthermore, a brake shoe of a drum brake in contact with a brake drum (material to be rubbed) can be similarly applied.

The invention claimed is:

1. A friction material having a copper content of less than 5 wt %, the friction material comprising:
   a titanic acid salt having a content of 1 wt % or more and 8 wt % or less;
   a cryolite powder having a content of 0.5 wt % or more and 5 wt % or less; and
   an iron oxide powder having a median diameter of 15 to 30 μm (D50) and a content of 1 wt % or more and 10 wt % or less.

2. The friction material according to claim 1, wherein the content of the cryolite powder is 0.5 wt % or more and 3 wt % or less.

3. The friction material according to claim 2, wherein the content of the iron oxide powder is 1 wt % or more and 7 wt % or less.

4. The friction material according to claim 3, wherein the copper content is less than 0.5 wt %.

5. The friction material according to claim 2, wherein the copper content is less than 0.5 wt %.

6. The friction material according to claim 1, wherein the content of the iron oxide powder is 1 wt % or more and 7 wt % or less.

7. The friction material according to claim 6, wherein the copper content is less than 0.5 wt %.

8. The friction material according to claim 1, wherein the copper content is less than 0.5 wt %.

9. A composition for a friction material having a copper content of less than 5 wt %, the composition comprising:
   a fiber base material;
   an organic filler;
   an abrasive;
   a titanic acid salt having a content of 1 wt % or more and 8 wt % or less;
   an iron oxide powder having a median diameter of 15 to 30 μm (D50) and a content of 1 wt % or more and 10 wt % or less;
   a lubricant; and
   an inorganic filler containing a cryolite powder having a content of 0.5 wt % or more and 5 wt % or less.

* * * * *